United States Patent
Riley

(10) Patent No.: US 12,196,556 B2
(45) Date of Patent: Jan. 14, 2025

(54) DETERMINATION OF POSITION, VELOCITY, AND/OR HEADING BY SIMULTANEOUS USE OF ON-DEVICE AND ON-VEHICLE INFORMATION

(71) Applicant: QUALCOMM Incorporated, San Diego, CA (US)

(72) Inventor: Wyatt Thomas Riley, Chesterbrook, PA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/819,895

(22) Filed: Aug. 15, 2022

(65) Prior Publication Data

US 2022/0390236 A1 Dec. 8, 2022

Related U.S. Application Data

(63) Continuation of application No. 16/020,009, filed on Jun. 27, 2018, now Pat. No. 11,441,904, which is a
(Continued)

(51) Int. Cl.
*G01C 21/00* (2006.01)
*G01C 21/16* (2006.01)
(Continued)

(52) U.S. Cl.
CPC ....... *G01C 21/005* (2013.01); *G01C 21/1654* (2020.08); *G01C 21/28* (2013.01);
(Continued)

(58) Field of Classification Search
CPC ...... G01C 21/00; G01C 21/165; G01C 21/28; G01C 25/005; G01S 5/0072; G01S 19/49
See application file for complete search history.

(56) References Cited

U.S. PATENT DOCUMENTS

| 5,828,585 A | 10/1998 | Welk et al. |
| 6,801,855 B1 | 10/2004 | Walters et al. |

(Continued)

FOREIGN PATENT DOCUMENTS

| CN | 1920946 A | 2/2007 |
| CN | 101266152 A | 9/2008 |

(Continued)

OTHER PUBLICATIONS

International Preliminary Report on Patentability—PCT/US2013/070296, The International Bureau of WIPO—Geneva, Switzerland, May 11, 2015.
(Continued)

*Primary Examiner* — Truc M Do
(74) *Attorney, Agent, or Firm* — QUALCOMM Incorporated

(57) ABSTRACT

Systems, apparatus and methods to supplement, combine, replace, verify and calibrate in-vehicle and in-device sensors and GNSS systems are presented. A mobile device and a vehicle navigation system share sensor and GNSS information to arrive at an improved navigation solution. For example, a navigation solution computed by a vehicle may rely on a sensor signal from a mobile device. Similarly, a navigation solution computed by a mobile device may use a sensor signal or a GNSS signal from a vehicle.

30 Claims, 4 Drawing Sheets

Related U.S. Application Data continuation of application No. 14/080,514, filed on Nov. 14, 2013, now Pat. No. 10,041,798.

(60) Provisional application No. 61/799,560, filed on Mar. 15, 2013, provisional application No. 61/734,326, filed on Dec. 6, 2012.

(51) Int. Cl.
    *G01C 21/28*      (2006.01)
    *G01C 25/00*      (2006.01)
    *G01S 5/00*      (2006.01)
    *G01S 19/49*      (2010.01)

(52) U.S. Cl.
    CPC .......... *G01C 25/005* (2013.01); *G01S 5/0072* (2013.01); *G01S 19/49* (2013.01)

(56) References Cited

U.S. PATENT DOCUMENTS

| | | |
|---|---|---|
| 6,823,188 B1 | 11/2004 | Stern |
| 6,853,911 B1 | 2/2005 | Sakarya |
| 6,975,959 B2 | 12/2005 | Dietrich et al. |
| 7,200,409 B1 | 4/2007 | Ichikawa et al. |
| 8,180,379 B2 | 5/2012 | Forstall et al. |
| 8,386,677 B2 | 2/2013 | Lydon et al. |
| 8,390,510 B2 | 3/2013 | Riley et al. |
| 8,793,031 B2 | 7/2014 | Anantha et al. |
| 2002/0082025 A1 | 6/2002 | Baese et al. |
| 2004/0142678 A1 | 7/2004 | Krasner |
| 2004/0203569 A1 | 10/2004 | Jijina et al. |
| 2006/0287824 A1 | 12/2006 | Lin |
| 2007/0016362 A1 | 1/2007 | Nelson et al. |
| 2007/0239350 A1 | 10/2007 | Zumsteg et al. |
| 2007/0275734 A1 | 11/2007 | Gaal et al. |
| 2008/0147321 A1 | 6/2008 | Howard et al. |
| 2009/0005070 A1 | 1/2009 | Forstall et al. |
| 2009/0005080 A1 | 1/2009 | Forstall et al. |
| 2009/0088974 A1 | 4/2009 | Yasan et al. |
| 2009/0259424 A1 | 10/2009 | Dutta et al. |
| 2010/0103033 A1* | 4/2010 | Roh ........................ G01S 19/40 342/357.32 |
| 2010/0151838 A1 | 6/2010 | Wormald et al. |
| 2010/0286912 A1 | 11/2010 | Noue |
| 2011/0054716 A1 | 3/2011 | Staehlin et al. |
| 2011/0163914 A1* | 7/2011 | Seymour ................. G01S 19/34 342/357.42 |
| 2011/0191024 A1* | 8/2011 | DeLuca .................. G01C 21/34 701/472 |
| 2012/0022780 A1 | 1/2012 | Kulik et al. |
| 2012/0173195 A1 | 7/2012 | Opshaug et al. |
| 2012/0232793 A1 | 9/2012 | Hagiwara et al. |
| 2012/0245839 A1* | 9/2012 | Syed .................... G01C 21/206 702/150 |
| 2014/0163870 A1 | 6/2014 | Riley et al. |
| 2014/0350847 A1 | 11/2014 | Ichinokawa |

FOREIGN PATENT DOCUMENTS

| | | |
|---|---|---|
| CN | 201314824 Y | 9/2009 |
| CN | 102759359 A | 10/2012 |
| EP | 1571598 A1 | 9/2005 |
| EP | 1870672 A1 | 12/2007 |
| EP | 2244063 A2 | 10/2010 |
| EP | 2351989 A1 | 8/2011 |
| JP | 2002048560 A | 2/2002 |
| JP | 2004340633 A | 12/2004 |
| JP | 2009121885 A | 6/2009 |
| JP | 2011117739 A | 6/2011 |
| KR | 20020084999 A | 11/2002 |
| WO | 2011035068 | 3/2011 |
| WO | 2011065066 A1 | 6/2011 |

OTHER PUBLICATIONS

International Search Report and Written Opinion—PCT/US2013/070296—ISA/EPO—Sep. 19, 2014.
Partial International Search Report—PCT/US2013/070296—ISA/EPO—Mar. 6, 2014.

\* cited by examiner

DETERMINATION OF POSITION, VELOCITY, AND/OR HEADING BY SIMULTANEOUS USE OF ON-DEVICE AND ON-VEHICLE INFORMATION

CROSS-REFERENCE TO RELATED APPLICATIONS

The present application is a continuation of non-provisional U.S. application Ser. No. 16/020,009, titled "Determination of position, velocity, and/or heading by simultaneous use of on-device and on-vehicle information," filed Jun. 27, 2018, which is a continuation of non-provisional U.S. application Ser. No. 14/080,514, titled "Determination of position, velocity and/or heading by simultaneous use of on-device and on-vehicle information," filed Nov. 14, 2013, which claims the benefit of and priority under 35 U.S.C. § 119(e) to U.S. Provisional Application No. 61/799,560, filed Mar. 15, 2013, and U.S. Provisional Application No. 61/734,326, filed Dec. 6, 2012, both of which are titled "Method for improved determination of position, velocity and/or heading by simultaneous use of on-device and on-vehicle information." The aforementioned United States applications are hereby incorporated by reference in their entireties.

BACKGROUND

I. Field of the Invention

This disclosure relates generally to systems, apparatus and methods for in-vehicle navigation, and more particularly to integrating a navigation system of a mobile device with sensors of a navigation system of a vehicle.

II. Background

Mobile users often want to use navigation to find various places while on-board a vehicle. When navigating in area challenged to receive global position satellite (GPS) signals or other global navigation satellite system (GNSS) signals, such as in urban areas, both assistance data and on-device inertial sensors are used to supplement or in place of GNSS signals alone. Often a mobile device computes one navigation solution with its sensors and a vehicle will compute a separate solution with its sensors, which may include on-vehicle inertial and/or odometer sensors. What is needed is a way to unify and coordinate sensors of both the mobile device and the vehicle to provide a single navigation solution with information from the combined mobile device and vehicle sensors.

BRIEF SUMMARY

Disclosed are systems, apparatus and methods to combine in-vehicle and in-device sensors to compute an improved navigation solution.

According to some aspects, disclosed is a method to improve a navigation solution, the method comprising: commutatively coupling a first navigation system to a second navigation system; receiving, at the first navigation system, a signal from the second navigation system, wherein the signal comprises at least one of a sensor signal or a global navigation satellite system (GNSS) signal; and determining the navigation solution at the first navigation system based on the signal from the second navigation system.

According to some aspects, disclosed is a first navigation system for improving a navigation solution, the device comprising: an interface to a second navigation system and configure to receive a signal from the second navigation system, wherein the signal from the second navigation system comprises at least one of a sensor signal or a global navigation satellite system (GNSS) signal; a processor coupled to the interface and conferred to determine the navigation solution based on the signal from the second navigation system.

According to some aspects, disclosed is a first navigation system for improving navigation information, the first navigation system comprising: means for commutatively coupling the first navigation system to a second navigation system; means for receiving, at the first navigation system, a signal from the second navigation system, wherein the signal comprises at least one of a sensor signal or a global navigation satellite system (GNSS) signal; and means for determining the navigation solution at the first navigation system based on the signal from the second navigation system.

According to some aspects, disclosed is a non-transitory computer-readable storage medium including program code stored thereon for a first navigation system to improve a navigation solution, comprising program code to: commutatively couple a first navigation system to a second navigation system; receive, at the first navigation system, a signal from the second navigation system, wherein the signal comprises at least one of a sensor signal or a global navigation satellite system (GNSS) signal; and determine the navigation solution at the first navigation system based on the signal from the second navigation system.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
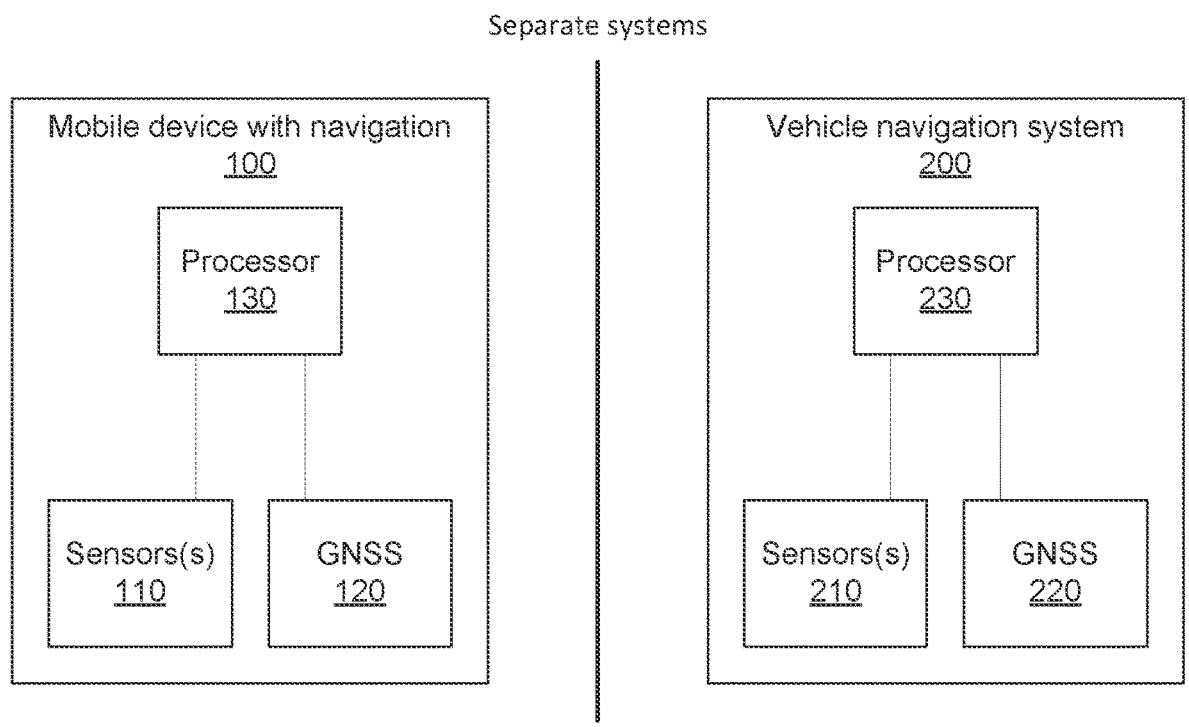
FIG. 1 illustrates a divide between navigation systems of a mobile device and a vehicle.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

FIG. 1 illustrates a divide between navigation systems of a mobile device 100 and a vehicle navigation system 200. The navigation systems of the mobile device 100 and the vehicle navigation system 200 are naturally separate systems. Existing navigation solutions use GNSS and sensor information from within the navigation system.

The mobile device 100 has a navigation system that has several components duplicated by the vehicle navigation system 200. The mobile device 100 includes one or more sensors 110, such as a 3-dimensional (3-D) accelerometer and/or a 3-D gyroscope (also referred to as a 3-D gyrometer). The sensors 110 may also include a compass providing a direction to magnetic north, a pressure sensor used to determine altitude, and the like. The mobile device 100 also includes a GNSS unit 120 and a processor 130. The vehicle navigation system 200 also includes one or more sensors 210, a GNSS unit 220 and a processor 230. The sensors 210 in the vehicle may include a 3-D accelerometer providing an accelerometer value, a 3-D gyroscope providing a gyroscope value, a turn-rate sensor providing a turn-rate value, an odometer providing an odometer value, a speedometer providing a speed value, and the like.

Each navigation system computes a separate navigation solution without the benefit of the duplicate and/or additional sensors of the corresponding system. That is, the mobile device 100 does not use sensors 210 or GNSS unit 220 of the vehicle navigation system 200. Similarly, the vehicle navigation system 200 does not use sensors 110 or GNSS unit 220 of the mobile device 100.

Figure 2:
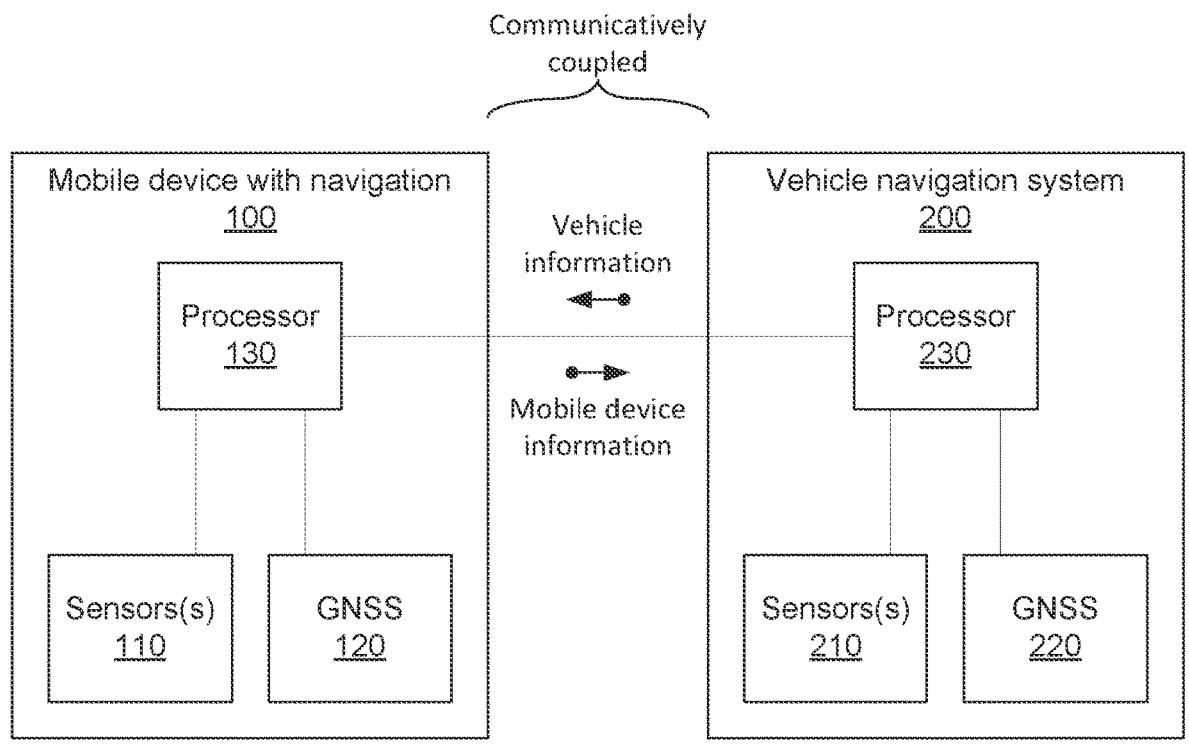
FIGS. 2 and 3 illustrate communicatively coupling a navigation system of a mobile device and a navigation system of a vehicle, in accordance with some embodiments of the present invention.
Figure 3:
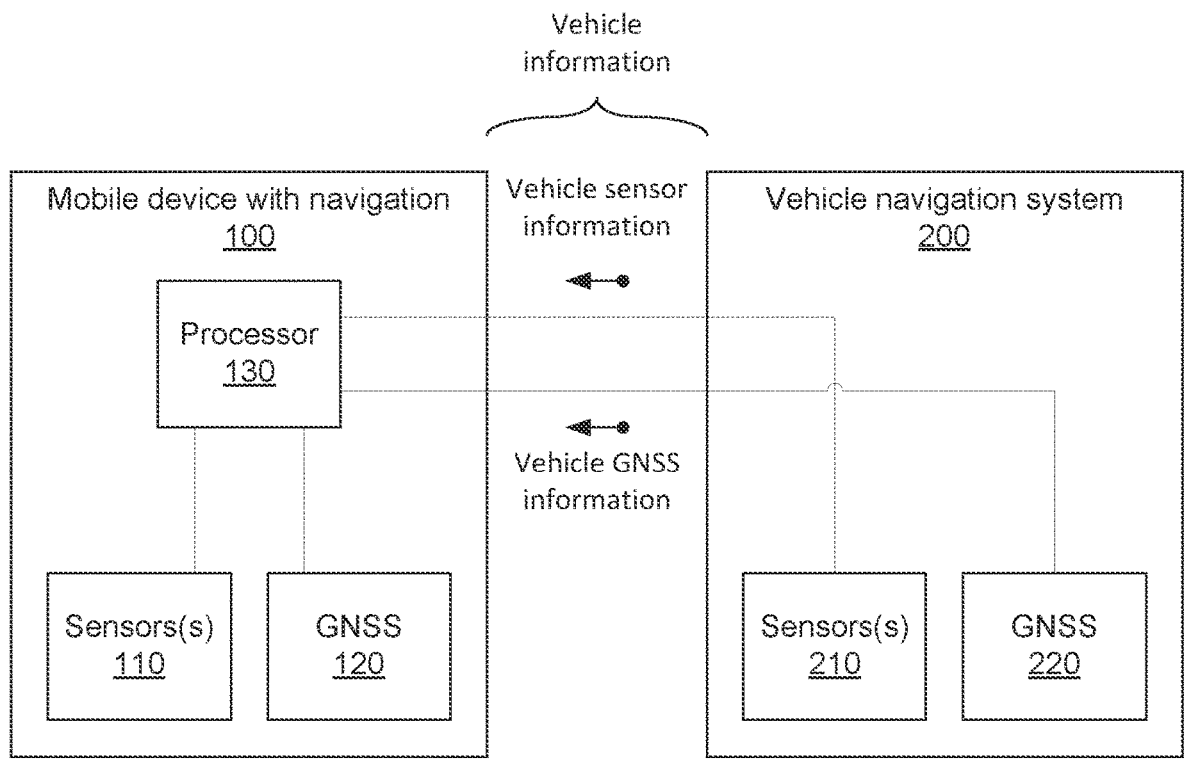

FIGS. 2 and 3 illustrate communicatively coupling a navigation system of a mobile device 100 and a vehicle navigation system 200, in accordance with some embodiments of the present invention. The mobile device 100 may receive vehicle information from the sensors 210 and GNSS unit 220 of the vehicle navigation system 200. Similarly, the vehicle navigation system 200 may receive mobile device information from the sensors 110 and GNSS unit 120 of the mobile device 100.

A navigation system using a Kalman filter may now have additional inputs from the sensor signals of the other navigation system, thereby resulting in an improved navigation solution. For example, a mobile device 100 may have a Kalman filter with inputs based on signals from each of its own sensors. Now, the Kalman filter may have additional inputs for signals base on sensors of the vehicle navigation system 200.

A navigation system of one device may be used to replace, combined, supplement, verify and/or calibrate sensor measurements and/or GNSS from a second navigation system.

A navigation system may have a lower quality or lower resolution sensor but can replace sensor with a higher quality or higher resolution sensor from the other navigation system. For example, a mobile device 100 may have a GNSS receiver of its own but the GNSS receiver of the vehicle receives a signal of higher quality (e.g., by an outdoor antenna mounted on the vehicle). Similarly, a mobile device 100 may have an inexpensive accelerometer offering a low resolution signal but the vehicle navigation system 200 may have a more expensive higher resolution signal. A heading detector on the vehicle navigation system 200 may be provided to the mobile device 100. A vehicle navigation system 200 may only have a 2-D gyroscope so uses signals from a 3-D gyroscope 112 on the mobile device 100.

A navigation system may be combined the same type of sensors and/or GNSS signals from two different navigation systems. For example, vehicle navigation system 200 may be receiving signals from a first satellite and a mobile device 100 may be receiving signals from a second satellite. Either navigation system may be insufficient alone to compute an adequate navigation solution. Therefore, one system may provide GNSS signals to the other system.

A navigation system may be missing a particular type of sensor may supplement its sensors with sensors from another navigation system. For example, signals from a barometer (used to determine altitude and change in altitude) in a mobile device 100 may be provided to a vehicle navigation system 200. Signals from a turn-rate detector or a speedometer in a vehicle navigation system 200 may be provided to a mobile device 100 not having direct access to such information. A vehicle navigation system 200 may not have a gyroscope but uses signals from a gyroscope 112 on the mobile device 100.

Sensor signals of one navigation system may be used to verify or calibrate sensor signals of another navigation system. For example, a mobile device 100 may verify that a sensor 110 providing measurements is within a tolerance threshold away from a sensor 210 on the vehicle navigation system 200. A speedometer in a vehicle navigation system 200 may be provided to a mobile device 100 to calibrate an accelerometer of the mobile device 100.

In FIG. 2, the mobile device 100 and the vehicle navigation system 200 are communicatively coupled to exchange vehicle information and/or mobile device information. The mobile device 100 and the vehicle navigation system 200 may be wirelessly coupled, for example, via a Bluetooth interface, or connected by wire, for example, via a mount. The mobile device 100 may detect when the devices are no longer communicatively coupled and then fall back to determining a navigation solution without sensors 210 and the GNSS unit 220 of the vehicle navigation system 200.

The vehicle information is send from the vehicle navigation system 200 to the mobile device 100 and may include vehicle sensor information vehicle from the vehicle sensors 210 and/or GNSS information from the GNSS unit 220. The mobile device information similarly may include mobile device sensor information from sensors 110 and/or mobile device GNSS information from the GNSS unit 120, and is send from the mobile device 100 to the vehicle navigation system 200. Methods describe below may use sensor signals from either or both the mobile device 100 and the vehicle navigation system 200. The method may be performed in the mobile device 100 or in the vehicle navigation system 200.

In FIG. 3, an embodiment is shown where the mobile device 100 by passes processor 230 of the vehicle navigation system 200. In effect, the processor 130 now has additional sensors 210 and/or additional GNSS unit 220 to replace, combined, supplement and/or verify sensors 110 and the GNSS unit 120. The processor 130 of the mobile device 100 directly communicates with the sensors 210 and the GNSS unit 220 of the vehicle navigation system 200 to acquire vehicle GNSS information and vehicle sensor information, respectfully. In this embodiment, the mobile device 100 acts as the master and the vehicle navigation system 200 acts as the slave. Often, the GNSS signals from GNSS unit 120 are inadequate and ignored. During the interim when GNSS signals are inadequate, navigation is provided by a dead-reckoning algorithm with the sensor signals.

In an alternative embodiment, the vehicle navigation system 200 acts as the master and the mobile device 100 acts as the slave. The processor 230 of the vehicle navigation system 200 receives mobile device sensor information from the sensors 110 and mobile device GNSS information from the GNSS unit 120 both in the mobile device.

Figure 4:
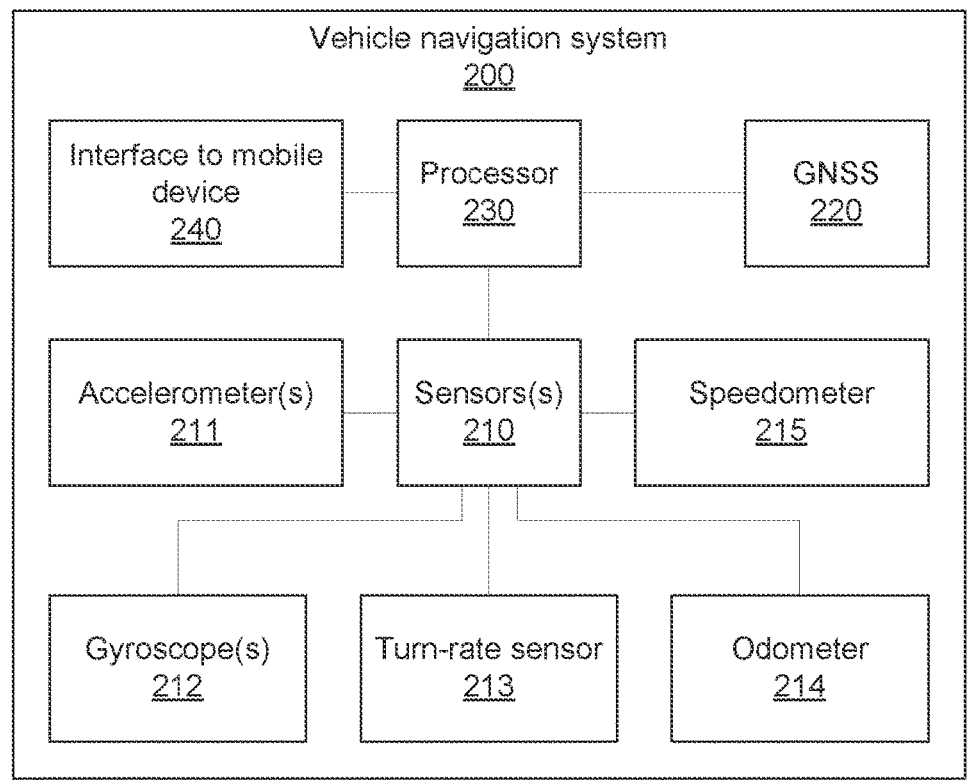
FIG. 4 shows a vehicle navigation system, in accordance with some embodiments of the present invention.

FIG. 4 shows a vehicle navigation system, in accordance with some embodiments of the present invention. The vehicle navigation system 200 includes sensors 210, a GNSS unit 220, a processor 230 and an interface 240 to the mobile device 100. The sensors 210 include one or more of an accelerometer 211, a gyroscope 212, a turn-rate sensor 213, an odometer 214, a speedometer 215, a compass, and the like. The accelerometer 211 measures acceleration in one, two or three perpendicular dimensions. The gyroscope 212 measures angular acceleration in one, two or three perpendicular dimensions. The turn-rate sensor 213 measures the turning rate of the steering wheel and/or the turning rate of the vehicle. The odometer 214 measures the travel distance of the vehicle. The speedometer 215 measures a current speed of the vehicle. The sensors 210 may also include a compass or magnetometer, which measures an angle to magnetic north. Other sensors useful for the navigation process may also be included in the vehicle navigation system 200.

The GNSS unit 220 includes a GNSS receiver, such as a GPS receiver, and a GNSS antenna. The processor 230 executes software modules necessary to compute a navigation solution. The interface 240 to the mobile device 100 couples the processor 230 to the sensors 110 and/or the GNSS unit 120 of the mobile device 100. Alternatively, or in addition to, the interface 240 couples the processor 230 of the vehicle navigation system 200 to the processor 130 of the mobile device 100.

Figure 5:
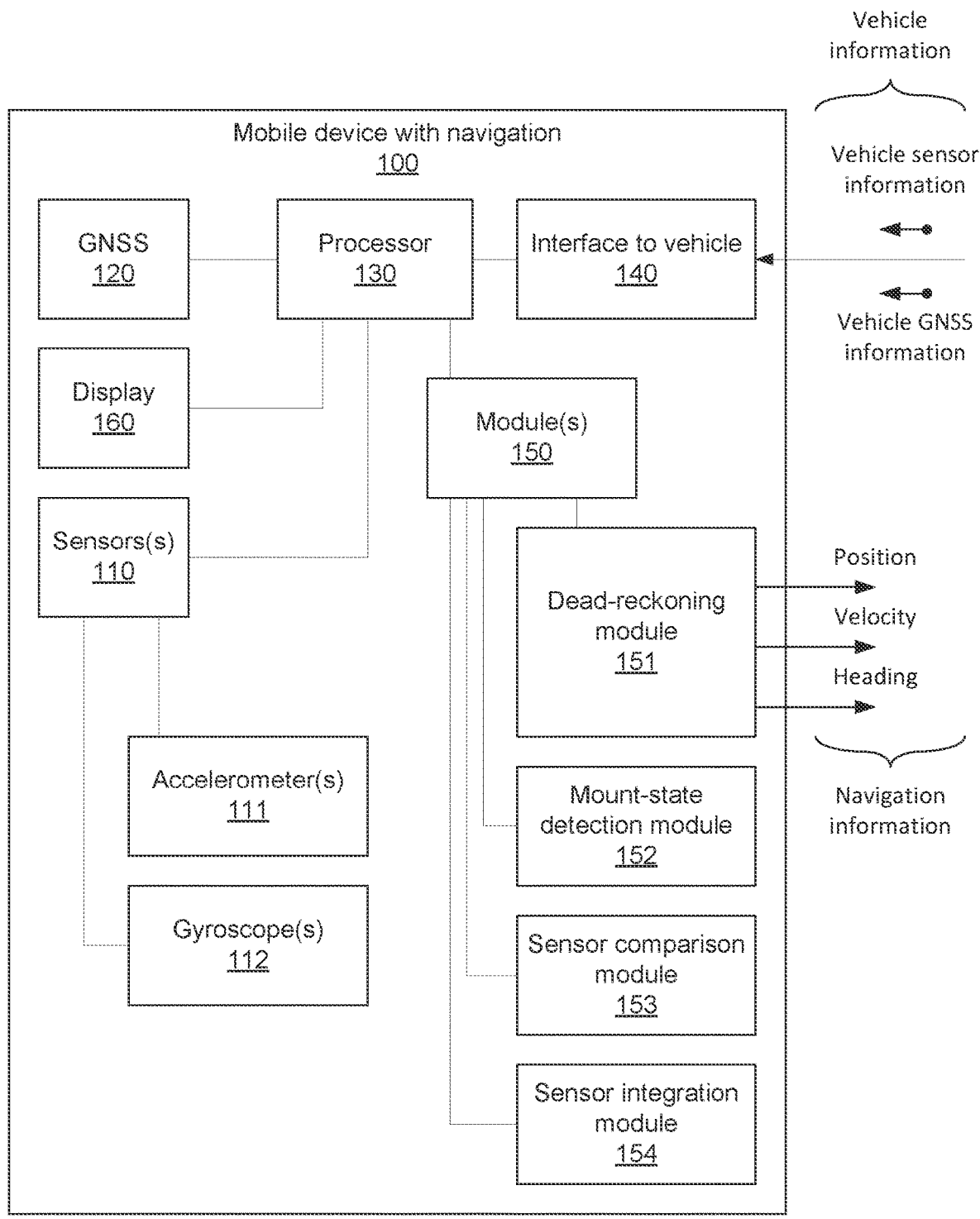
FIG. 5 shows a mobile device with a navigation system, in accordance with some embodiments of the present invention.

FIG. 5 shows a mobile device with a navigation system, in accordance with some embodiments of the present invention. The mobile device 100 includes sensors 110, a GNSS unit 120, a processor 130 and an interface 140 to vehicle navigation system 200. The sensors 110 include one or more of an accelerometer 111 and a gyroscope 112, described above with reference to the vehicle navigation system 200. Other sensors useful for the navigation process may also be included in the mobile device 100. The GNSS unit 120 includes a GNSS receiver, such as a GPS receiver, and a GNSS antenna.

Often the GNSS antenna of the vehicle navigation system 200 is positioned in a more advantageous location than the GNSS antenna of the mobile device 100. The processor 130 executes software modules 150 necessary to compute a navigation solution. The modules 150 may include a dead-reckoning module 151 executing a dead-reckoning algorithm, a mount-state detection module 152, a sensor comparison module 153, a sensor integration module 154, and the like. The dead-reckoning module 151 computes the position, velocity and/or heading from the sensor information from sensors 110 and sensors 210. The mount-state detection module 152 determines whether or not the mobile device 100 is in a mounted state in the vehicle.

The sensor comparison module 153 receives sensor signal from sensors 110 in the mobile device 100 and sensor signals from sensors 210 in the vehicle navigation system 200 and determines which is currently better. That is, a processor 130 determines a better sensor signal and a worse sensor signal from between the sensor signal from the sensors 110 in the mobile device 100 and the sensor signal from the sensors 210 in the vehicle navigation system 200. The processor 130 may use the better sensor signal and discards the worse sensor signal in determining the navigation information. Alternative, the processor 130 may integrate the sensor signals from both sensors 110 and sensors 210 with sensor integration module 154, and then compute the navigation information. The sensor integration module 154 integrates the sensor signals from sensors 110 in the mobile device 100 and sensor signals from the vehicle navigation system 200 into a continuous stream of sensor signals for the dead-reckoning module 151.

The interface 140 to the vehicle navigation system 200 couples the processor 130 to the sensors 210 and/or the GNSS unit 220 of the vehicle navigation system 200. Alternatively, or in addition to, the interface 140 couples the processor 130 of the mobile device 100 to the processor 230 of the vehicle navigation system 200. The processor 130 is also couple to a display 160, for example, to display the computed navigation information, including the computed position, velocity and heading.

The processor 230 may have modules similar to modules 150, thus allowing the vehicle navigation system 200 to used sensors 110 and GNSS unit 120 in the mobile device 100 to compute a navigation solution.

The sensor signals from the sensors 210 of the vehicle navigation system 200 may be used to calibrate the sensors 110 in the mobile device. Similarly, the sensor signals from the sensors 110 in the mobile device may be used to calibrate the sensors 210 of the vehicle navigation system 200. For example, the vehicle sensor 210 may tell the sensors 110 in the mobile device when the vehicle is at rest, traveling at a constant speed (without linear or angular accelerations). The mobile device 100 may then calibrate its accelerometer 111 and gyroscope 112.

Figure 6:
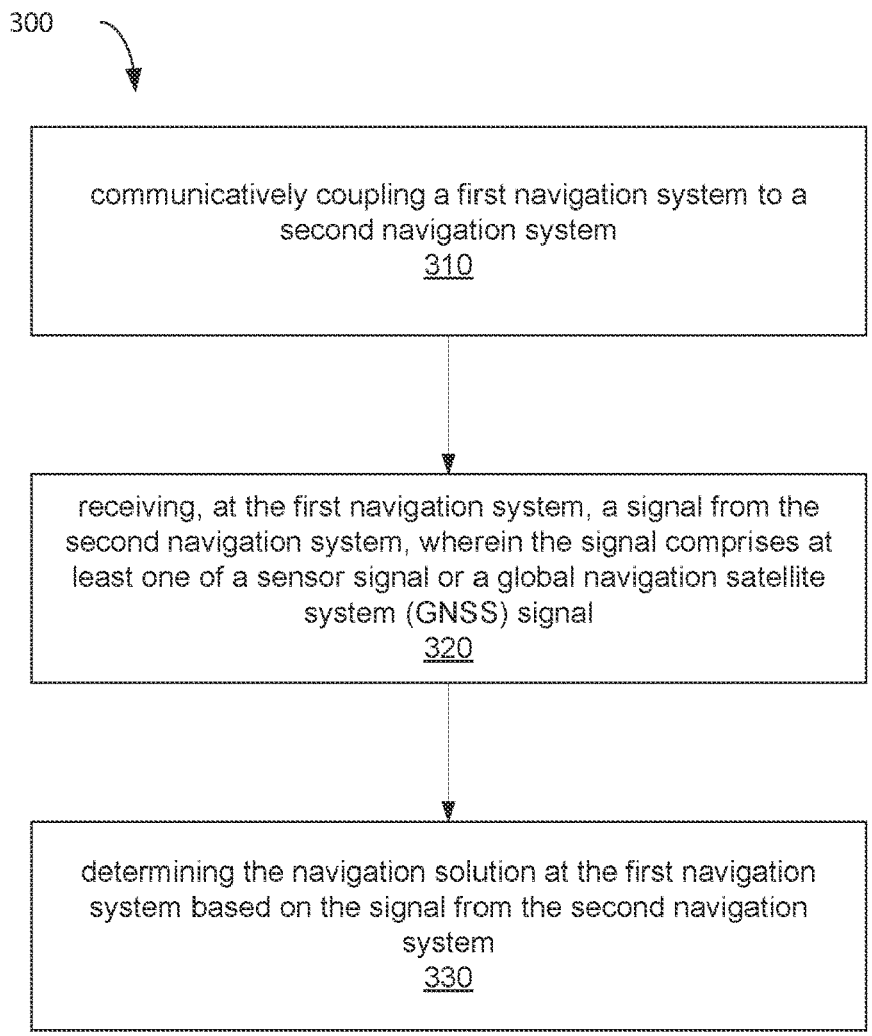
FIGS. 6 and 7 show a method 300 and system to combine in-vehicle and in-device sensors to compute an improved navigation solution.
Figure 7:
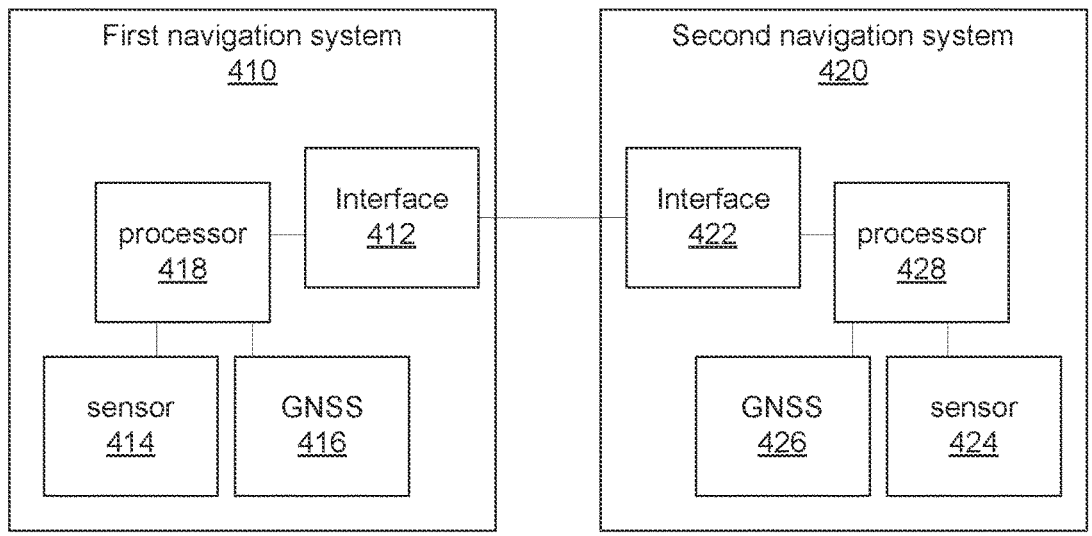

FIGS. 6 and 7 show a method 300 and system to combine in-vehicle and in-device sensors to compute an improved navigation solution.

In FIG. 6 at 310, a first navigation system 410 communicatively couples to a second navigation system 420. The first navigation system 410 may be a vehicle navigation system 200 and the second navigation system 420 may be a navigation system of a mobile device 100. Alternatively, the first navigation system 410 may be a navigation system of a mobile device 100 and the second navigation system 420 may be a vehicle navigation system 200.

At 320, an interface 412 receives, at the first navigation system 410, a signal from the second navigation system 420. The signal may be a sensor signal from a sensor 424 in the second navigation system 420. The sensor signal may be a turn-rate value from a turn-rate sensor, a speedometer value from a speedometer, an accelerometer value from an accelerometer, a gyroscope value from a gyroscope, a pressure value from a barometric sensor, and/or the like.

Alternatively or in addition to, the signal may be a GNSS signal (e.g., a GPS signal) from a GNSS receiver 426 in the second navigation system 420. A processor 418 in the first navigation system 410 may determine the GNSS signal from a GNSS receiver 416 in the first navigation system 410 is inadequate or insufficient because not enough satellites are received and/or the signal quality is not high enough to properly decode a satellite and/or any to an excessive amount of multipath exists.

At 330, the processor 418 determines the navigation solution at the first navigation system 410 based on the signal from the second navigation system 420. The navigation solution may be a position, velocity, heading, and/or the like. The processor 418 may also receive a sensor signal from a sensor 414 in the first navigation system 410, select between the sensor signal from the first navigation system 410 and the signal from the second navigation system 420 based on a desired characteristic resulting is a signal with the desired characteristic, and determine the navigation solution at the first navigation system 410 based on the signal with the desired characteristic. The desired characteristic may be an SINR, an SNR, a number of satellite signals received, a single-path satellite signal, lower uncertainty and/or the like. The desired characteristic may be set or configured by a user. The processor 418 may select a better, stronger or larger signal from between sensor signal and/or the GNSS signal from the first navigation system 410 and the signal from the second navigation system 420. Instead of selecting between the signals from the two navigation systems (410, 420), the processor 418 may use both signals from both navigation systems (410, 420) to compute the navigation solution. For example, a gyroscope in a mobile device may be used with an accelerometer in a vehicle for applying a dead-reckoning algorithm.

In some embodiments, a mount state detector determines a mobile device and a vehicle or communicatively couple, for example, via a wired connection and/or in a mounted state. Alternatively, a wireless detector may detect a wireless connection, for example, using Bluetooth, between a mobile device and a vehicle. The mount state detector or wireless detector may determine when the two devices are no longer communicatively coupled or in an un-mounted state.

In some embodiments, signals from a first navigation system 410 are used to calibrate sensors 424 in the second navigation system 420. For example, a signal from a speedometer of a vehicle may be used to calibrate an accelerometer or a gyroscope of a mobile device. Similarly, a sensor in the first navigation system 410 may be calibrated with a signal from the second navigation system 420.

In FIG. 7, a first navigation system 410 is communicatively coupled to a second navigation system 420. The systems may be communicatively coupled by a wired connection (e.g., via a mount) or wireless connection (e.g., via Bluetooth). The first navigation system 410 includes an interface 412 and a processor 418. The processor 418 acts as a means for performing the methods described herein.

Optionally, the first navigation system 410 includes a sensor 414 and/or a GNSS receiver 416. The second navigation system 420 includes an interface 422 and at least one of a sensor 424 and a GNSS receiver 426. The second navigation system 420 optionally includes a processor 428.

Some embodiments provide for a method to improve a navigation solution. The method comprises: (1) commutatively coupling a first navigation system to a second navigation system; (2) receiving, at the first navigation system, a signal from the second navigation system, wherein the signal comprises at least one of a sensor signal or a global navigation satellite system (GNSS) signal; and (3) determining the navigation solution at the first navigation system based on the signal from the second navigation system. The first navigation system may comprise a vehicle navigation system and the second navigation system may comprise a navigation system of a mobile device, or the first navigation system may comprise a navigation system of a mobile device and the second navigation system may comprise a vehicle navigation system. The signal from the second navigation system may comprise the sensor signal from a sensor the second navigation system. The sensor signal may comprise a turn-rate value, a speedometer value, an accelerometer value or a gyroscope value. The signal may comprise the GNSS signal, for example when the GNSS signals at the first navigation system are insufficient. The navigation solution comprises a position, a velocity and/or a heading. Determining the navigation solution may comprise: (1) receiving a sensor signal from a sensor in the first navigation system; (2) selecting between the sensor signal from the first navigation system and the signal from the second navigation system based on a desired characteristic resulting is a signal with the desired characteristic; and (3) determining the navigation solution at the first navigation system based on the signal with the desired characteristic; wherein the signal from the second navigation system comprises the sensor signal from a sensor in the second navigation system. Determining the navigation solution may comprise: (1) receiving a sensor signal from a sensor in the first navigation system; and (2) determining the navigation solution at the first navigation system using both the sensor signal from the first navigation system and the signal from the second navigation system; wherein the signal from the second navigation system comprises the sensor signal from a sensor in the second navigation system. Determining the navigation solution may comprise: (1) receiving a GNSS signal from a GNSS receiver in the first navigation system; (2) selecting between the GNSS signal from the first navigation system and the signal from the second navigation system based on a desired characteristic resulting is a signal with the desired characteristic; and (3) determining the navigation solution at the first navigation system based on the signal with the desired characteristic; wherein the signal from the second navigation system comprises the GNSS signal from a GNSS receiver in the second navigation system. Determining the navigation solution may comprise: (1) receiving a GNSS signal from a GNSS receiver in the first navigation system; and (2) determining the navigation solution at the first navigation system using both the GNSS signal from the first navigation system and the signal from the second navigation system; wherein the signal from the second navigation system comprises the GNSS signal from a GNSS receiver in the second navigation system. Determining the navigation solution may comprise using a dead-reckoning algorithm. The method may further comprise determining that the first navigation system and second navigation systems are communicatively coupled or are no longer communicatively coupled. The method may further comprise determining one of the first navigation system and the second navigation system is in a mounted state. The method may further comprises calibrating a sensor in the first navigation system with the signal from the second navigation system. The method may further comprise sending a sensor signal from the first navigation system to calibrate a sensor in the second navigation system.

Some embodiments provide for a first navigation system for improving a navigation solution. The first navigation system comprises: (1) an interface to a second navigation system and configure to receive a signal from the second navigation system, wherein the signal from the second navigation system comprises at least one of a sensor signal or a global navigation satellite system (GNSS) signal; and (2) a processor coupled to the interface and conferred to determine the navigation solution based on the signal from the second navigation system. The first navigation system may comprise a vehicle navigation system and the second navigation system may comprise a navigation system of a mobile device, or the first navigation system may comprise a navigation system of a mobile device and the second navigation system may comprise a vehicle navigation system. The interface may comprise a Bluetooth interface. The signal from the second navigation system may comprise the sensor signal from a sensor in the second navigation system or the GNSS signal from a GNSS receiver in the second navigation system. The first navigation system may further comprise: a sensor configured to provide a sensor signal; wherein the processor is further configured to: (1) select between the sensor signal and the signal from the second navigation system based on a desired characteristic resulting is a signal with the desired characteristic; and (2) wherein the processor configured to determine the navigation solution is configured to determine the navigation solution based on the signal with the desired characteristic. The first navigation system may further comprise: a sensor configured to provide a sensor signal; wherein the processor configured to determine the navigation solution is configured to determine the navigation solution using both the sensor signal and the signal from the second navigation system. The first navigation system may further comprise a mount. The first navigation system may further comprise: a sensor configured to provide a sensor signal; wherein the processor is further configured to calibrate the sensor based on the signal from the second navigation system. The first navigation system may further comprise: a sensor configured to provide a sensor signal; wherein the interface is further configured to send the sensor signal to the second navigation system for calibrating a sensor in the second navigation system.

Some embodiments provide for a first navigation system for improving a navigation solution. The first navigation system comprises: (1) means for commutatively coupling the first navigation system to a second navigation system; (2) means for receiving, at the first navigation system, a signal from the second navigation system, wherein the signal comprises at least one of a sensor signal or a global navigation satellite system (GNSS) signal; and (3) means for determining the navigation solution at the first navigation system based on the signal from the second navigation system. The first navigation system may comprise a vehicle navigation system and the second navigation system may comprise a navigation system of a mobile device, or the the first navigation system may comprise a navigation system of a mobile device and the second navigation system may comprise a vehicle navigation system. The signal from the second navigation system may comprise the sensor signal from the second navigation system. The signal from the second navigation system may comprise the GNSS signal from a GNSS receiver in the second navigation system. The means for determining the navigation solution may comprise: (1) means for receiving the sensor signal in the first navigation system; (2) means for selecting between the sensor signal from the first navigation system and the signal from the second navigation system based on a desired characteristic resulting is a signal with the desired characteristic; and (3) means for determining the navigation solution at the first navigation system based on the signal with the desired characteristic. The means for determining the navigation solution may comprise: (1) means for receiving the sensor signal in the first navigation system; and (2) means for determining the navigation solution at the first navigation system using both the sensor signal from the first navigation system and the signal from the second navigation system. The first navigation system may further comprise means for calibrating a sensor in the first navigation system with the signal from the second navigation system. The first navigation system may further comprise means for sending a sensor signal from the first navigation system to calibrate a sensor in the second navigation system.

Some embodiments provide for a non-transitory computer-readable storage medium including program code stored thereon for a first navigation system to improve a navigation solution. The program code: (1) commutatively couples the first navigation system to a second navigation system; (2) receives, at the first navigation system, a signal from the second navigation system, wherein the signal comprises at least one of a sensor signal or a global navigation satellite system (GNSS) signal; and (3) determines the navigation solution at the first navigation system based on the signal from the second navigation system. The code to determine the navigation solution may comprise code to: (1) receive the sensor signal from a sensor in the first navigation system; (2) select between the sensor signal from the first navigation system and the signal from the second navigation system based on a desired characteristic resulting is a signal with the desired characteristic; and (3) determine the navigation solution at the first navigation system based on the signal with the desired characteristic. The code to determine the navigation solution may comprise code to: (1) receive the sensor signal from a sensor in the first navigation system; and (2) determine the navigation solution at the first navigation system using both the sensor signal from the first navigation system and the signal from the second navigation system.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. An apparatus for wireless communication at a first navigation system, comprising:
   a memory; and
   at least one processor coupled to the memory and, based at least in part on information stored in the memory, the at least one processor is configured to:
      communicatively couple the first navigation system to a second navigation system;
      receive a global navigation satellite system (GNSS) signal and a first signal, wherein the first signal comprises a first set of measurements from at least one of a first speedometer, a first turn-rate sensor, or a first odometer at the first navigation system;
      receive a second signal from the second navigation system, wherein the second signal comprises a second set of measurements from at least one of a second speedometer, a second turn-rate sensor, or a second odometer;

compare the first signal and the second signal to determine a third set of measurements associated with at least one of a stronger signal or a larger signal; and determine a navigation solution at the first navigation system based on the third set of measurements and the GNSS signal from the first navigation system.

2. The apparatus of claim 1, further comprising a transceiver, wherein, to receive the GNSS signal at the first navigation system, the at least one processor is configured to receive, via the transceiver, the GNSS signal from a GNSS unit at the first navigation system.

3. The apparatus of claim 1, wherein the at least one processor is further configured to:

integrate at least one of the first signal or the second signal with the GNSS signal from the first navigation system into a stream of signals comprising the first signal and the GNSS signal, wherein, to determine the navigation solution at the first navigation system, the at least one processor is configured to determine the navigation solution using the stream of signals.

4. The apparatus of claim 3, wherein, to integrate the at least one of the first signal or the second signal with the GNSS signal from the first navigation system into the stream of signals, the at least one processor is configured to use a Kalman filter to integrate the at least one of the first signal or the second signal with the GNSS signal from the first navigation system into the stream of signals.

5. The apparatus of claim 1, wherein the first navigation system comprises a vehicle navigation system, wherein the second navigation system comprises a mobile device navigation system.

6. The apparatus of claim 1, wherein the first navigation system comprises a mobile device navigation system, wherein the second navigation system comprises a vehicle navigation system.

7. The apparatus of claim 1, wherein the at least one processor is further configured to:

calibrate a sensor at the first navigation system with the second signal from the second navigation system.

8. The apparatus of claim 1, wherein the at least one processor is further configured to:

transmit the first signal to calibrate a sensor at the second navigation system.

9. The apparatus of claim 1, wherein the navigation solution comprises at least one of a position, a velocity, or a heading of the first navigation system.

10. The apparatus of claim 1, wherein the navigation solution comprises at least one of a position, a velocity, or a heading of the second navigation system.

11. A method to generate a navigation solution, the method comprising:

communicatively coupling a first navigation system to a second navigation system;

receiving, at the first navigation system, a global navigation satellite system (GNSS) signal and a first signal, wherein the first signal comprises a first set of measurements from at least one of a first speedometer, a first turn-rate sensor, or a first odometer at the first navigation system;

receiving, at the first navigation system, a second signal from the second navigation system, wherein the second signal comprises a second set of measurements from at least one of a second speedometer, a second turn-rate sensor, or a second odometer;

comparing, using a sensor comparison module, the first signal and the second signal to determine a third set of measurements associated with at least one of a stronger signal or a larger signal; and determining the navigation solution at the first navigation system based on the third set of measurements and the GNSS signal from the first navigation system.

12. The method of claim 11, wherein receiving the GNSS signal at the first navigation system comprises receiving the GNSS signal from a GNSS unit at the first navigation system.

13. The method of claim 11, further comprising integrating at least one of the first signal or the second signal with the GNSS signal from the first navigation system into a stream of signals comprising the first signal and the GNSS signal, wherein determining the navigation solution at the first navigation system comprises determining the navigation solution using the stream of signals.

14. The method of claim 13, wherein integrating at least one of the first signal or the second signal with the GNSS signal from the first navigation system into the stream of signals comprises using a Kalman filter to integrate at least one of the first signal or the second signal with the GNSS signal from the first navigation system into the stream of signals.

15. The method of claim 11, wherein the first navigation system comprises a vehicle navigation system, wherein the second navigation system comprises a mobile device navigation system.

16. The method of claim 11, wherein the first navigation system comprises a mobile device navigation system, wherein the second navigation system comprises a vehicle navigation system.

17. The method of claim 11, further comprising calibrating a sensor at the first navigation system with the second signal from the second navigation system.

18. The method of claim 11, further comprising:

transmitting the first signal to calibrate a sensor at the second navigation system.

19. The method of claim 11, wherein the navigation solution comprises at least one of a position, a velocity, or a heading of the first navigation system.

20. The method of claim 11, further comprising determining that at least one of the first navigation system and the second navigation system is in a mounted state.

21. An apparatus for wireless communication, comprising:

means for communicatively coupling a first navigation system to a second navigation system;

means for receiving, at the first navigation system, a global navigation satellite system (GNSS) signal and a first signal, wherein the first signal comprises a first set of measurements from at least one of a first speedometer, a first turn-rate sensor, or a first odometer at the first navigation system;

means for receiving, at the first navigation system, a second signal from the second navigation system, wherein the second signal comprises a second set of measurements from at least one of a second speedometer, a second turn-rate sensor, or a second odometer;

means for comparing, using a sensor comparison module, the first signal and the second signal to determine a third set of measurements associated with at least one of a stronger signal or a larger signal; and means for determining a navigation solution at the first navigation system based on the third set of measurements and the GNSS signal from the first navigation system.

22. The apparatus of claim 21, further comprising a transceiver, wherein the means for receiving the GNSS signal at the first navigation system comprises means for receiving, via the transceiver, the GNSS signal from a GNSS unit at the first navigation system.

23. The apparatus of claim 21, further comprising means for integrating at least one of the first signal or the second signal with the GNSS signal from the first navigation system into a stream of signals comprising the first signal and the GNSS signal, wherein the means for determining the navigation solution at the first navigation system comprises means for determining the navigation solution using the stream of signals.

24. The apparatus of claim 23, wherein the means for integrating at least one of the first signal or the second signal with the GNSS signal from the first navigation system into the stream of signals comprises means for using a Kalman filter to integrate at least one of the first signal or the second signal with the GNSS signal from the first navigation system into the stream of signals.

25. The apparatus of claim 21, wherein the first navigation system comprises a vehicle navigation system, wherein the second navigation system comprises a mobile device navigation system.

26. The apparatus of claim 21, wherein the first navigation system comprises a mobile device navigation system, wherein the second navigation system comprises a vehicle navigation system.

27. The apparatus of claim 21, further comprising means for calibrating a sensor at the first navigation system with the second signal from the second navigation system.

28. The apparatus of claim 21, further comprising:
means for transmitting the first signal to calibrate a sensor at the second navigation system.

29. The apparatus of claim 21, wherein the navigation solution comprises at least one of a position, a velocity, or a heading of the first navigation system.

30. A computer-readable medium storing computer executable code at a first navigation system, the code when executed by a processor causes the processor to:
communicatively couple the first navigation system to a second navigation system;
receive a global navigation satellite system (GNSS) signal and a first signal, wherein the first signal comprises a first set of measurements from at least one of a first speedometer, a first turn-rate sensor, or a first odometer at the first navigation system;
receive a second signal from the second navigation system, wherein the second signal comprises a second set of measurements from at least one of a second speedometer, a second turn-rate sensor, or a second odometer;
compare the first signal and the second signal to determine a third set of measurements associated with at least one of a stronger signal or a larger signal; and
determine a navigation solution at the first navigation system based on the third set of measurements and the GNSS signal from the first navigation system.

* * * * *